(12) United States Patent
Simboli

(10) Patent No.: US 6,855,061 B2
(45) Date of Patent: Feb. 15, 2005

(54) VEHICULAR DRIVESHAFT ASSEMBLY

(75) Inventor: Andrew R. Simboli, Downingtown, PA (US)

(73) Assignee: Dana Corporation, Toledo, OH (US)

( * ) Notice: Subject to any disclaimer, the term of this patent is extended or adjusted under 35 U.S.C. 154(b) by 18 days.

(21) Appl. No.: 10/407,919

(22) Filed: Apr. 4, 2003

(65) Prior Publication Data

US 2003/0224863 A1 Dec. 4, 2003

Related U.S. Application Data

(60) Provisional application No. 60/369,946, filed on Apr. 4, 2002.

(51) Int. Cl.[7] ................................................. F16C 3/00
(52) U.S. Cl. ....................................... 464/182; 228/135
(58) Field of Search ......................... 464/182; 228/135; 403/265, 270, 271, 272

(56) References Cited

U.S. PATENT DOCUMENTS

| | | | |
|---|---|---|---|
| 1,260,690 A | | 3/1918 | Liady |
| 1,515,355 A | | 11/1924 | Mitchell |
| 1,700,319 A | | 1/1929 | Kjekstad |
| 1,773,068 A | | 8/1930 | Vienneau |
| 2,132,575 A | | 10/1938 | Moise |
| 2,152,076 A | | 3/1939 | Menough |
| 2,330,039 A | | 9/1943 | Feenstra |
| 3,512,811 A | | 5/1970 | Bardgette et al. |
| 3,819,902 A | | 6/1974 | Sidbeck et al. |
| 4,279,275 A | * | 7/1981 | Stanwood et al. .......... 138/109 |
| 4,792,320 A | * | 12/1988 | Nickel ......................... 464/182 |
| 4,930,204 A | * | 6/1990 | Schurter ..................... 29/419.2 |
| 5,086,854 A | | 2/1992 | Roussy |
| 5,672,286 A | * | 9/1997 | Seeds .................... 219/137 PS |
| 5,901,988 A | | 5/1999 | Aihara et al. |
| 6,001,018 A | | 12/1999 | Breese |
| 6,062,982 A | * | 5/2000 | Cartwright ................... 403/270 |
| 6,352,385 B1 | * | 3/2002 | Wojciechowski et al. ... 403/365 |

FOREIGN PATENT DOCUMENTS

| | | |
|---|---|---|
| FR | 2448068 | 8/1980 |
| JP | 200021679 | 10/2000 |

* cited by examiner

*Primary Examiner*—Gregory J. Binda
*Assistant Examiner*—Aaron Dunwoody
(74) *Attorney, Agent, or Firm*—MacMillan, Sobanski & Todd, LLC

(57) ABSTRACT

A weld between a tube yoke and a driveshaft tube can accommodate a greater amount of torsional shear stresses and, therefore, increase the load carrying capacity of a driveshaft assembly. The driveshaft assembly includes a yoke having a sleeve portion and a driveshaft tube having an end that extends about the sleeve portion of the yoke. The end of the tube is secured to the sleeve portion of the yoke by a weld having a shape that traverses multiple planes, such as a sinusoidal, saw-tooth, or square tooth shape. The weld occupies a greater area and, thus, has a greater surface contact between the sleeve portion of the yoke and the end of the driveshaft tube. The force vectors of the torsional shear stress sustained by the weld are in multiple planes. As a result, the force vectors of the torsional shear stress impinge the welds at different angles, and the weld has a greater load carrying capacity.

16 Claims, 3 Drawing Sheets

VEHICULAR DRIVESHAFT ASSEMBLY

CROSS REFERENCE TO RELATED APPLICATION

This application claims the benefit of U.S. Provisional Application No. 60/369,946, filed Apr. 4, 2002, the disclosure of which is incorporated herein by reference.

BACKGROUND OF THE INVENTION

This invention relates in general to vehicular drive train systems including a driveshaft assembly for transferring rotational power from an engine/transmission assembly to an axle assembly. In particular, this invention relates to an improved structure for such a vehicular driveshaft assembly.

In most land vehicles in use today, a drive train system is provided for transmitting rotational power from an output shaft of an engine/transmission assembly to an input shaft of an axle assembly so as to rotatably drive one or more wheels of the vehicle. To accomplish this, a driveshaft assembly is connected between the output shaft of the engine/transmission assembly and the input shaft of the axle assembly. The driveshaft assembly can include a driveshaft tube, the ends of which can be connected to the output shaft of the engine/transmission assembly and the input shaft of the axle assembly by respective universal joints. Such universal joints are well known in the art and provide a rotational driving connection therebetween, while accommodating a limited amount of angular misalignment between the rotational axes of the various shafts. The connection between the ends of the driveshaft tube and the universal joints is usually accomplished by tube yokes disposed within the ends of the driveshaft tube. Each tube yoke typically includes a tube seat at one end and a lug structure at the other end. The tube seat is a generally cylindrical-shaped member that is adapted to be inserted into an open end of the driveshaft tube. Accordingly, the tube seat enables torque to be transmitted between the driveshaft tube and the tube yoke.

In known driveshaft assemblies, the tube yoke is secured to the driveshaft tube by a ring weld. The ring weld is a circular weld that extends about the entire circumference of the joint between the tube yoke and the driveshaft tube. The ring weld extends throughout a single plane that is perpendicular to the central axis of the driveshaft tube. As a result, all of the torsional shear stresses that are encountered during operation of the driveshaft assembly are applied in that circumferential plane. Thus, the ring weld must be sufficiently strong as to be capable of accommodating all of such torsional shear stresses that are generated in that single perpendicular plane during operation. Although this type of weld has been effective, it would be desirable to provide an improved structure for such a weld between a tube yoke and a driveshaft tube that is capable of accommodating a greater amount of such torsional shear stresses and, therefore, increases the load carrying capacity of the driveshaft assembly.

SUMMARY OF THE INVENTION

This invention relates to an improved structure for such a weld between a tube yoke and a driveshaft tube that is capable of accommodating a greater amount of torsional shear stresses and, therefore, increases the load carrying capacity of a driveshaft assembly. The driveshaft assembly includes at least a first yoke and a tube. The first yoke has a sleeve portion. The tube has at least a first end. The first end of the tube extends about the sleeve portion of the first yoke. The first end of the tube is secured to the sleeve portion of the first yoke by a weld. The weld has a shape that traverses multiple planes. A driveshaft assembly according to another embodiment of the invention includes a first yoke having a sleeve portion, a second yoke having a sleeve portion, and a tube having a first end and a second end. The first end of the tube extends about the sleeve portion of the first yoke. The second end of the tube extends about the sleeve portion of the second yoke. The first end of the tube is secured to the sleeve portion of the first yoke by a weld having a shape that traverses multiple planes. The second end of the tube is secured to the sleeve portion of the second yoke by a weld having a shape that traverses multiple planes. The welds occupy a greater area and thus have greater surface contact with the sleeve portions of the first and second yokes and the ends of the driveshaft tube. The force vectors of the torsional shear stress sustained by the welds are in multiple planes. As a result, the force vectors of the torsional shear stress impinge the welds at different angles. Hence, the welds have a greater load carrying capacity.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
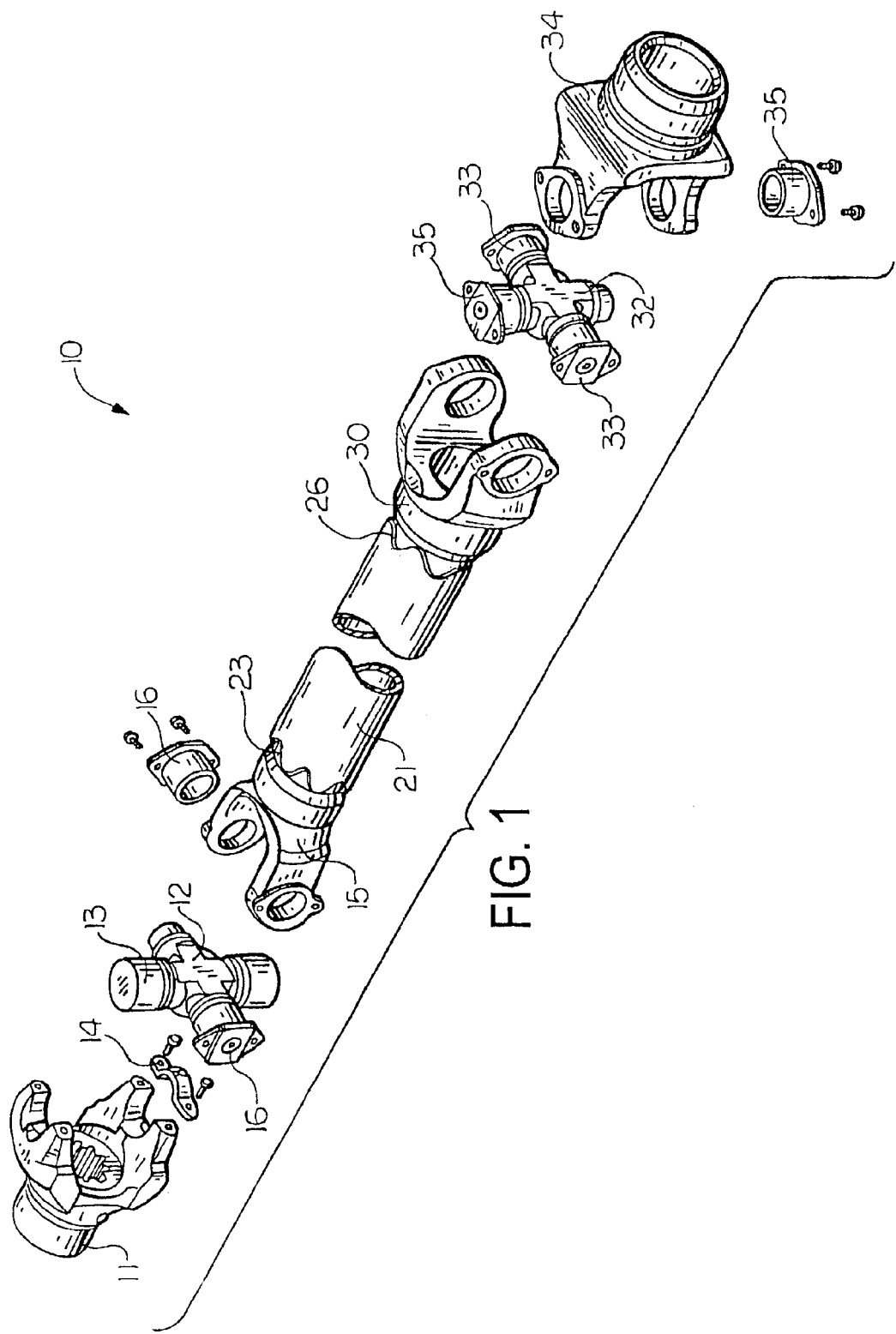
FIG. 1 is an exploded perspective view of a first embodiment of a vehicular driveshaft assembly structured in accordance with this invention.

Referring now to the drawings, there is illustrated in FIG. 1 a first embodiment of a driveshaft assembly, indicated generally at 10, that is adapted to transmit rotational power from an output shaft (not shown) of an engine/transmission assembly to an input shaft (also not shown) of an axle assembly so as to rotatably drive one or more wheels of the vehicle. Although this invention will be described and illustrated in the context of the driveshaft assembly 10 illustrated herein and described below, it will be appreciated that this invention may be practiced to form any type of driveshaft assembly for use in a vehicular drive train system or other torque transmitting structure.

The illustrated driveshaft assembly 10 includes an end yoke 11 or other similar structure that can be splined or otherwise connected to the output shaft of the engine/transmission assembly so as to be rotatably driven thereby. The end yoke 11 has a pair of yoke arms that are secured to a first opposed pair of trunnions of a cross 12, such as by respective bearing cups 13 and retainer straps, one of which is shown at 14. A second opposed pair of trunnions of the cross 12 are secured to the arms of a first tube yoke 15 or other similar structure, such as by respective bearing cups 16. The end yoke 11, the cross 12, and the first tube yoke 15 form a first universal joint assembly that provides a rotational driving connection between the end yoke 11 and the first tube yoke 15, while accommodating a limited amount of angular misalignment between the rotational axes thereof.

The first tube yoke 15 is provided at a first end of a driveshaft tube 21. A second tube yoke 30 is provided at a second end of the driveshaft tube 21. The second tube yoke 30 has a pair of yoke arms that are secured to a first opposed pair of trunnions of a cross 32, such as by respective bearing cups 33. A second opposed pair of trunnions of the cross 32 are secured to the arms of an end yoke 34 or other similar structure, such as by respective bearing cups 35. The second tube yoke 30, the cross 32, and the end yoke 34 form a second universal joint assembly that provides a rotational driving connection between the second tube yoke 30 and the end yoke 34, while accommodating a limited amount of angular misalignment between the rotational axes thereof. The end yoke 34 can be splined or otherwise connected to the input shaft (not shown) of the axle assembly so as to rotatably drive same.

Figure 2:
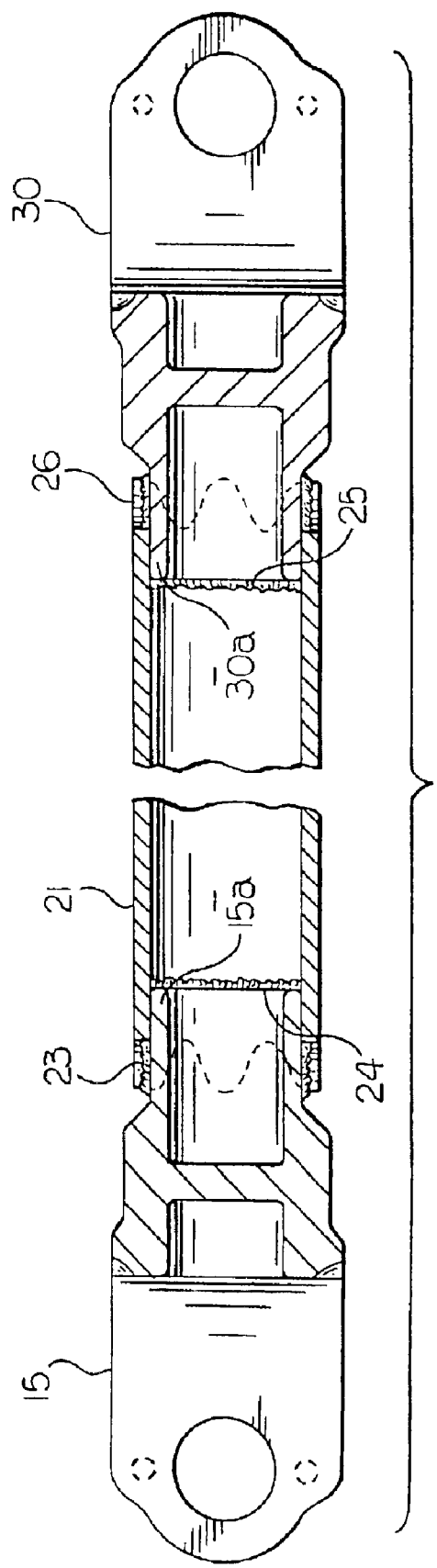
FIG. 2 is an enlarged sectional elevational view of the first embodiment of the driveshaft assembly illustrated in FIG. 1.

Referring now to FIG. 2, the structure of the driveshaft 21 is illustrated in detail. As mentioned above, the driveshaft assembly 10 includes the first tube yoke 15 and the driveshaft tube 21. The first tube yoke 15 is preferably forged or cast from a material, such as a conventional heat treated steel alloy material, and includes a sleeve portion 15a that extends co-axially from the arms thereof. The sleeve portion 15a of the first tube yoke 15 has an outer surface that is adapted to be received by the first end of the driveshaft tube 21 telescopically therein. To accomplish this, the sleeve portion 15a of the first tube yoke 15 is preferably formed having an outer surface defining an outer diameter that is approximately equal to an inner diameter defined by an inner surface of the first end of the driveshaft tube 21. The sleeve portion 15a can be formed using conventional processes, such as machining, and the like. Thus, the sleeve portion 15a of the first tube yoke 15 can be received within the first end of the driveshaft tube 21 in a press fit relationship. The driveshaft tube 21 is preferably formed from the same or similar material as the first tube yoke 15. Then, the driveshaft tube 21 and the first tube yoke 15 can be secured together using conventional welding processes (laser or metal inert gas (MIG) welding, for example, such as shown at 23) or other techniques that are suited for joining components formed from similar materials.

Similar to the first tube yoke 15 described above, the second tube yoke 30 is preferably forged or cast from a material, such as a conventional heat treated steel alloy material, and includes a sleeve portion 30a that extends co-axially from the arms thereof. The sleeve portion 30a of the second tube yoke 30 has an outer surface that is adapted to be received by the second end of the driveshaft tube 21 telescopically therein. To accomplish this, the sleeve portion 30a of the second tube yoke 30 is preferably formed having an outer surface defining an outer diameter that is approximately equal to an inner diameter defined by an inner surface of the second end of the driveshaft tube 21. The sleeve portion 30a can be formed using conventional processes, such as machining, and the like. Thus, the sleeve portion 30a of the second tube yoke 30 can be received within the second end of the driveshaft tube 21 in a press fit relationship. The driveshaft tube 21 is preferably formed from the same or similar material as the second tube yoke 30. Then, the driveshaft tube 21 and the second tube yoke 30 can be secured together using conventional welding processes (MIG welding, for example, such as shown at 26) or other techniques that are suited for joining components formed from similar materials.

According to the first embodiment of the invention, the first and second ends of the driveshaft 21 have an irregular shape. It is most preferable that the first and second ends of the driveshaft 21 have a shape that follows a symmetrical repeating pattern. Thus, in the first embodiment of the invention illustrated in FIGS. 1 and 2, the first and second ends of the driveshaft 21 are sinusoidal shaped. The weld 23 that is made to secure the first end of the driveshaft tube 21 to the first tube yoke 15 follows along the first end of the driveshaft 21. Consequently, this weld 23 is a sinusoidal shaped weld, as best shown in FIG. 1. Similarly, the weld 26 that is made to secure the second end of the driveshaft tube 21 and the second tube yoke 30 also follows along the second end of the driveshaft 21. Hence, this weld 26 is likewise a sinusoidal shaped weld. The sinusoidal shaped welds 23 and 26 have a longer length than a conventional ring weld. The sinusoidal shaped welds 23 and 26 extends throughout a larger axial extent than the conventional ring weld, which extends only in a relatively narrow single plane. Consequently, the sinusoidal welds 23 and 26 occupy a greater area and thus have greater surface contact with the sleeve portions 15a and 30a of the first and second tube yokes 15 and 30 and the respective ends of the driveshaft tube 21. The force vectors of the torsional shear stress sustained by the sinusoidal shaped welds 23 and 26 are in multiple planes. As a result, the force vectors of the torsional shear stress impinge the sinusoidal shaped welds 23 and 26 at different angles. Consequently, the force vectors of the torsional shear stress impinging the sinusoidal shaped welds 23 and 26 at any single point are less than the force vectors impinging the ring weld under similar operating conditions. The preferred symmetry of the sinusoidal shaped welds 23 and 26 equally distributes the torsional shear stress throughout the sinusoidal shaped welds 23 and 26. Hence, the sinusoidal shaped welds 23 and 26 are stronger than a conventional ring weld. As a result, the driveshaft assembly 10 has an increased load carrying capacity.

To further increase the load capacity of the driveshaft assembly 10, supplemental ring welds 24 and 25 can be provided at the ends of the sleeve portion 15a and 30a of the first and second tube yokes 15 and 30 inside the respective ends of the driveshaft tube 21. The ring welds 24 and 25 can be provided using conventional welding processes (MIG welding, for example) or other techniques that are suited for joining components formed from similar materials. The ring welds 24 and 25 further increase the overall strength of the driveshaft assembly 10. The resultant driveshaft assembly 10 may be suitable for use in vehicles that sustain even greater loads during use.

Figure 4:
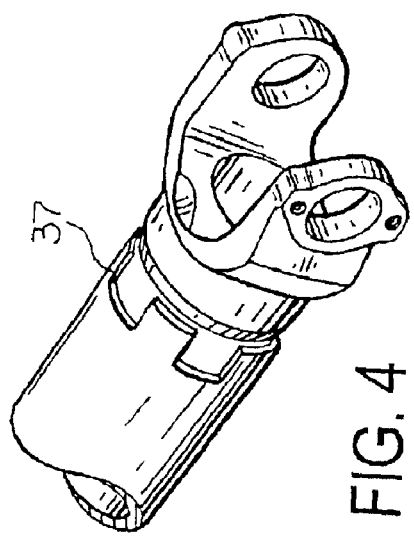
FIG. 4 is a perspective view of a portion of a third embodiment of a vehicular driveshaft assembly in accordance with this invention.
Figure 3:
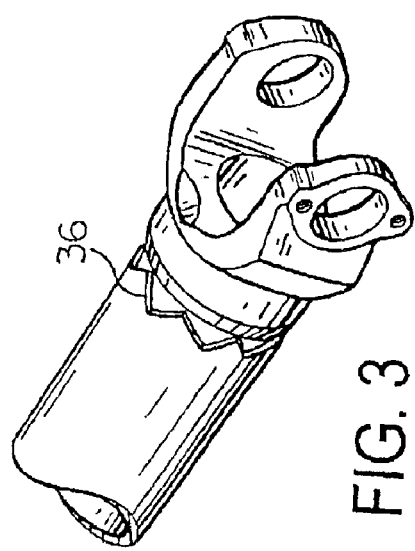
FIG. 3 is a perspective view of a portion of a second embodiment of a vehicular driveshaft assembly in accordance with this invention.

It should be appreciated by one of ordinary skill in the art that this invention is not intended to be limited to the sinusoidal shaped welds shown and described above. Other welds may be suitable for carrying out the invention. For example, a saw-tooth shaped weld 36 is shown in FIG. 3. A square tooth shaped weld 37 is shown in FIG. 4. These, and welds having other shapes, may be suitable for carrying out the invention.

Figure 5:
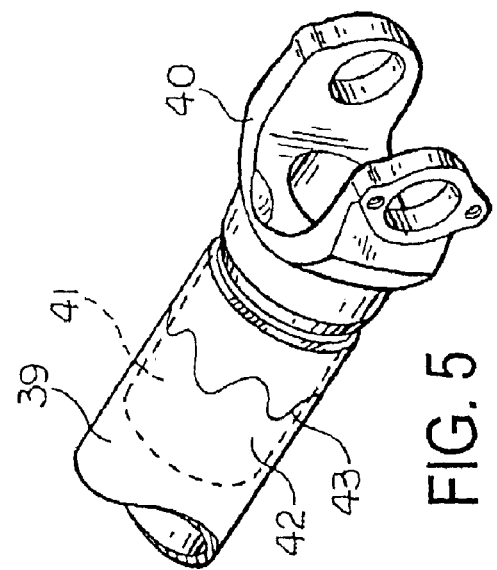
FIG. 5 is a perspective view of a portion of a fourth embodiment of a vehicular driveshaft assembly in accordance with this invention.

It should further be appreciated by one of ordinary skill in the art that a driveshaft assembly according to the instant invention may be provided with welds that traverse multiple planes even if the ends of the tube yokes 15 and 30 do not traverse multiple planes. For example, in FIG. 5 there is illustrated a driveshaft tube 39 having an end that terminates in a single plane. Unlike the ends of the tube yokes described above, the end of the driveshaft tube 39 does not traverse multiple planes. There is also illustrated a tube yoke 40 having a sleeve portion 41 having an end inside the driveshaft tube 39 that terminates in a single plane, like that of the end of the driveshaft tube 39. A portion of the driveshaft tube 39 and a portion of the sleeve portion 41 of the tube yoke 40 overlap to form an overlapping region 42 between the end of the driveshaft tube 39 and the end of the sleeve portion 41. According to yet another embodiment of the invention, a weld 43 is provided in the overlapping region 42. The weld 43 has an irregular shape. It is most preferable that the weld 43 have a shape that follows a symmetrical repeating pattern, similar to the irregular shaped welds described above. For example, the weld 43 shown has a sinusoidal shape. The weld 43 can be provided using conventional welding processes (MIG welding, for example) or other techniques that are suited for joining components formed from similar materials. It should be appreciated that welds of other shapes, such as the sawtooth shaped weld 36 and the square tooth shaped weld 37 shown above, may be suitable for carrying out the invention. The sinusoidal shaped weld 43, though not at the end of the driveshaft tube 39, should be suitable for securing the driveshaft tube 39 to the sleeve portion 41 of the tube yoke 40.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, various end component configurations utilizing dissimilar metals can be disposed at both ends of the driveshaft tube 21 rather than only one end shown in the illustrated embodiment of the invention.

What is claimed is:

1. A torque transmitting driveshaft assembly comprising:
   at least a first yoke including a sleeve portion; and
   a tube having at least a first end, said first end of said tube extending about said sleeve portion of said first yoke, said first end of said tube being secured to said sleeve portion of said first yoke by a first outer weld having a shape that traverses multiple planes, said first end of said tube also being secured to said sleeve by a second inner ring weld, such that when the driveshaft assembly is transmitting torque, force vectors of torsional shear stress sustained by said first weld are in multiple axial planes.

2. The driveshaft assembly defined in claim 1 wherein said first end of said tube is press fit about said sleeve portion of said first yoke.

3. The driveshaft assembly defined in claim 1 wherein said tube further includes a second end press fit about a sleeve portion of a second yoke and secured to said sleeve portion of said second yoke by a weld having a shape that traverses multiple planes.

4. The driveshaft assembly defined in claim 1 wherein the shape of said weld is a symmetrical pattern.

5. The driveshaft assembly defined in claim 1 wherein the shape of said weld is a repeating pattern.

6. The driveshaft assembly defined in claim 1 wherein the shape of said weld is sinusoidal.

7. The driveshaft assembly defined in claim 1 wherein the shape of said weld is a saw-tooth.

8. The driveshaft assembly defined in claim 1 wherein the shape of said weld is a square tooth.

9. A torque transmitting driveshaft assembly comprising:
   a first yoke having a sleeve portion; and
   a tube having a first end extending about and overlapping said sleeve portion of said first yoke and secured to said sleeve portion of said first yoke by a weld having a shape that traverses multiple axial planes such that when the driveshaft assembly is transmitting torque, force vectors of torsional shear stress sustained by said weld are in multiple axial planes.

10. The driveshaft assembly defined in claim 9 wherein said first end of said tube is press fit about said sleeve portion of said first yoke.

11. The driveshaft assembly defined in claim 9 wherein the shape of said weld is a symmetrical pattern.

12. The driveshaft assembly defined in claim 9 wherein the shape of said weld is a repeating pattern.

13. The driveshaft assembly defined in claim 9 wherein the shape of said weld is sinusoidal.

14. The driveshaft assembly defined in claim 9 wherein the shape of said weld is a saw-tooth.

15. The driveshaft assembly defined in claim 9 wherein the shape of said weld is a square tooth.

16. The driveshaft assembly defined in claim 9 wherein said first end of said tube is further secured to said sleeve portion of said first yoke by a ring weld.

* * * * *